United States Patent
Raikar et al.

(10) Patent No.: US 7,228,564 B2
(45) Date of Patent: Jun. 5, 2007

(54) METHOD FOR CONFIGURING A NETWORK INTRUSION DETECTION SYSTEM

(75) Inventors: Amit Raikar, Sunnyvale, CA (US); Guruprasad Ramarao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/627,374

(22) Filed: Jul. 24, 2003

(65) Prior Publication Data
US 2005/0039047 A1 Feb. 17, 2005

(51) Int. Cl.
*G06F 11/00* (2006.01)
(52) U.S. Cl. .......................................... 726/23; 726/11
(58) Field of Classification Search ................ 726/1–4, 726/11, 22–25; 709/223–225
See application file for complete search history.

(56) References Cited
U.S. PATENT DOCUMENTS

| | | | |
|---|---|---|---|
| 5,991,881 A | 11/1999 | Conklin et al. | |
| 6,578,147 B1 * | 6/2003 | Shanklin et al. | 726/22 |
| 6,704,874 B1 * | 3/2004 | Porras et al. | 726/22 |
| 6,988,208 B2 | 1/2006 | Hrabik et al. | |
| 2003/0110392 A1 | 6/2003 | Aucsmit et al. | |

\* cited by examiner

*Primary Examiner*—Hosuk Song

(57) ABSTRACT

Disclosed is a method for configuring an intrusion detection system in a network which comprises determining a location in the network for a deployed intrusion detection sensor of the intrusion detection system, deploying the intrusion detection sensor in the determined location, enabling the intrusion detection sensor to monitor communication in a portion of the network, tuning the intrusion detection sensor to an appropriate level of awareness of the content in the communication in the network, prioritizing responses generated by the intrusion detection sensor to achieve an appropriate response to a detected intrusion in the network, configuring intrusion response mechanisms in the network to achieve an appropriate response by the mechanisms; and re-tuning the intrusion detection sensor in response to a prior intrusion detection.

25 Claims, 4 Drawing Sheets

METHOD FOR CONFIGURING A NETWORK INTRUSION DETECTION SYSTEM

RELATED U.S. APPLICATION

This application incorporates herein by reference the co-pending patent application, U.S. Ser. No. 10/349,385, entitled "A Method For Protecting Security Of Network Intrusion Detection Sensors," filed Jan. 21, 2003, and assigned to the assignee of the present application.

FIELD OF THE INVENTION

The present invention relates to the field of computer network security, specifically to intrusion detection and prevention. The present invention also relates to a method and architecture for providing security to a provisionable utility data center.

BACKGROUND OF THE INVENTION

Modern networking continues to provide communication and information access increases and improvements. The continuing growth of networking systems and technology seems limitless and the speed of networked communications has brought benefits to nearly every human endeavor.

In addition to the inherent complexities of network communications, recent trends in information technology have seen large enterprises and other users moving towards a centralization of some network services, notably data storage and mining as well as some more complex applications. This centralization is realized in many instances by contracted access to provisionable, or virtually reconfigurable, networks. A provisionable network allows a centralization of information technology (IT) services and enterprise-wide, and even internet-wide, access to specialized data and functions. The various moves to re-centralize IT systems of all kinds is driven in part by shortages in IT staff and by the intrinsic inefficiencies of distributed systems. Notably, many IT managers are migrating to a smaller number of large data centers. Enabled by abundant and relatively inexpensive network bandwidth, IT services can now be distributed to users globally. The need to nest server-side technology near the client workstation is lessening, which has led to this dramatic change in IT architecture.

Security of networks has been a concern since before the first important data storage in an accessible computer system. Even more than earlier distributed networks, provisionable networks are exposed to possible security lapse and even attack through the multitudinous communications links such systems entail. Because there is necessary communication within and between resources contained within the provisionable data center, as well as communication with clients outside the network, the possible avenues of security failure are many.

In addition to "normal" hacker attack, security breaches can consist of such things as the unauthorized entry into a portion of a database by an otherwise authorized user or the unauthorized use of an application managed by the center. An example of this could be use by a foreign engineering entity of a supercomputer computational fluid dynamics facility, perhaps barred by technology exchange law, wherein the foreign entity's use of other portions of the same provisionable data center is legitimate and desirable.

Another example involves a case wherein there are competing clients legitimately served by the UDC and who share some of the available resources, such as a marketing database. These same two clients may also employ the UDC for secure archiving of proprietary data that neither wants the other to access. Furthermore, the management system of a provisionable data center itself could be the target of a focused intrusion whose goal could be the weakening of the management structure to enable other intrusions.

A technology of intrusion detection has grown in company with that of the provisionable network. Network intrusion detection systems (NIDS) and their management infrastructures are now as complex as the networks they protect.

Designing and deploying a Network Intrusion Detection System (NIDS) for providing effective attack detection capabilities to an infrastructure is an extremely difficult task. Apart from the minor difficulties of understanding how and where to physically deploy NIDS sensors, the major difficulty is in understanding where sensors should be most effectively deployed and, more importantly, how to configure the NIDS sensors. Configuration of NIDS sensors, in terms of enabling the proper intrusion attack signatures, assigning the correct severities to them, and associating the most effective responses to those alerts, has not been documented as a streamlined, guided, process and in its absence most configurations are either done with the default settings or by tuning them with production environment observations. Default sensor settings are unreliable across the installation spectrum and NIDS often deal with storms of false positives when used with a default configuration. Even though tuning the NIDS in the production environment over a period of time is desirable if used for the final tuning, using the process for fully configuring a NIDS sensor can prove disastrous in terms of false negatives as also very time consuming and requiring continuous periodic tuning.

In the absence of a clear streamlined guided process, NIDS sensors have been either configured with default settings or tuned in production environments. Using default settings can only be relied (and that too minimally owing to usage in disparate environments) for their severities and would surely result in a storm of false "positives" if used with the default configuration. On the other hand, tuning the NIDS in the production environment over a period of time for fully configuring an NIDS sensor could prove disastrous in terms of false "negatives" as also very time consuming and requiring continuous periodic tuning. Also in the absence of any standardized framework for assigning severities or associating response actions, even an NIDS solution that uses excellent sensors looses its effectiveness because of inconsistencies in its alerting and response.

What is needed, then, is a method for configuring network intrusion detection sensors in a network such that the management components of the network are protected from intrusions that originate from either an external source, or from the systems within a less trusted part of the network management infrastructure. Such a configuration method should enable the cost effective deployment of sensors that are tuned to determine and discriminate between the threat levels of detected intrusions and to be able to generate an appropriate response to a detected intrusion.

SUMMARY OF THE INVENTION

Specifically, a method is disclosed for configuring an intrusion detection system in a network which comprises determining a location in the network for a deployed intrusion detection sensor of the intrusion detection system, deploying the intrusion detection sensor in the determined location, enabling the intrusion detection sensor to monitor communication in a portion of the network, tuning the intrusion detection sensor to an appropriate level of awareness of the content in the communication in the network, prioritizing responses generated by the intrusion detection sensor to achieve an appropriate response to a detected intrusion in the network, configuring intrusion response mechanisms in the network to achieve an appropriate response by the mechanisms; and re-tuning the intrusion detection sensor in response to a prior intrusion detection.

BRIEF DESCRIPTION OF THE DRAWINGS

The operation of this invention can be best visualized by reference to the drawings.

DETAILED DESCRIPTION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

This application incorporates herein by reference the co-pending patent application, U.S. Ser. No. 10/349,385, entitled "A Method For Protecting Security Of Network Intrusion Detection Sensors," filed Jan. 21, 2003, and assigned to the assignee of the present application.

Figure 1:
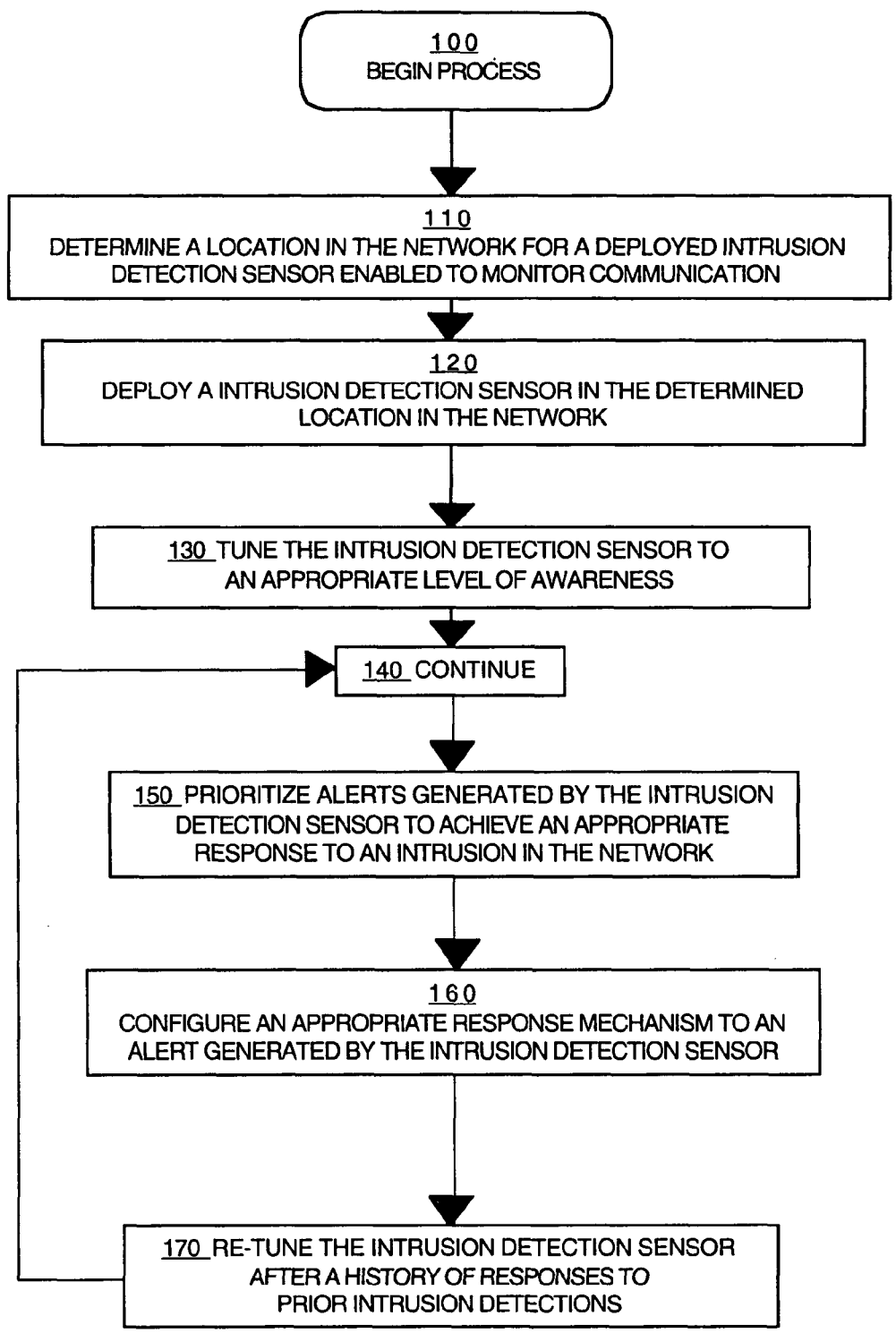
FIG. 1 illustrates, in block flow diagram format, a method for configuring intrusion detection sensors in accordance with embodiments of the present invention.

FIG. 1 illustrates an embodiment of the present invention by which intrusion detection sensors, as part of a network intrusion detection system (NIDS), can be deployed in a network so as to reduce the frequency of either false positive intrusion alerts or "false negative" indications wherein an intrusion in the network passes undetected. It is noted that intrusion detection sensors may also be referred to, in this discussion, as NIDS sensors.

In FIG. 1, process 100 begins with the determination 110 of an effective location for deployment. A cost effective location, in this embodiment of the present invention, is one in which a deployed sensor is able to monitor sufficient communication that has a high probability of containing an intrusion. In this embodiment, that means a location in the network having access to monitor a communication path that is a likely avenue for hostile intrusions.

Determination of an effective location, as used in this discussion of embodiments of the present invention, implies understanding of the requirements of both the NIDS and the network being protected, understanding the network topology, and understanding the systems within the network that require protection.

Process 100 continues with the deployment 120 of an intrusion detection sensor which is enabled to monitor communications in a link in the network. The deployment of a sensor is predicated, in this embodiment, on a high probability area of hostile intrusion. The external firewall between the provisionable network and the internet, for example, is a very likely location of attempted intrusions and is, therefore, a logical candidate for intrusion detection sensor deployment.

The following are among ways in which an effective location may be determined and the NIDS sensors may be deployed: 1) monitor a link that connects an untrusted zone with an outside interface of the firewall that provides perimeter protection to the trusted network; 2) monitor a link that connects a trusted zone with the inside interface of the firewall that provides perimeter protection to the trusted network; and 3) monitor network traffic targeted to (or originating from) specific systems within the network that need to be extremely secure.

Monitoring an external link that connects the untrusted zone with the outside interface of the firewall that provides perimeter protection to the trusted network, as in 1) above, can be done, in this embodiment, for understanding the external attacker and also the external attacks, whether they are successful or not. In this embodiment of the present invention, this type of deployment is used only when a sensor is already deployed in a location such as 2) above. This location can be an additional detection shield to a deployed location as in 2).

Monitoring the link that connects the trusted zone with the inside interface of the firewall that provides perimeter protection to the trusted network, as in 2) above, can be a cost efficient deployment location. This deployment can be done with the intention of detecting external attacks that have managed to cross the perimeter defense, whether they are successful or not. It also provides detection capabilities for any trusted internal systems being infected by Trojans or viruses based on any probes, or attempts to propagate themselves or compromise other systems. An advantage of configuring sensors for a deployment as in 2) is that they need not be tuned very finely, as there is a lesser probability of detecting false positives. Also, it is easier to determine a severity, or alarm level, to be provided for alerts originating from sensors deployed in this way, as it is known that the alerts are for attack traffic that has already penetrated through the perimeter defense firewall, and hence has a relatively high probability of compromising security. If it is necessary to more clearly differentiate between different severities of attacks, or in case of high traffic monitoring by sensors that find hard to monitor, is it necessary to configure and tune the sensors more finely in this deployment scenario.

Monitoring network traffic targeted to (or originating from) specific systems within the network that need to be extremely secure, as in 3), above. This is done in normal local area network (LAN) environments with suitable taps and hubs, while in a switched environment. This type of deployment can be achieved by configuring a sensor to monitor specific ports of a switch. This deployment can be very effective for detecting attacks targeted against very critical systems in a network environment where the internal systems are not fully trustable. As in type 2) deployments, type 3) deployments detect attacks targeted towards specific subsets of systems. These deployments can also monitor whether these systems are infected by any Trojans or viruses based on probes, or attempts to compromise, or propagate to, other systems.

Similarly to type 2) deployments, an advantage of configuring sensors for a type 3) deployment is that they need not be tuned very finely, as there is a lesser probability of detecting false positives. Also, as in type 2), it is relatively easy to determine a severity, or alarm level, to be provided for alerts originating from sensors deployed in this way, as it is known that the alerts are for attack traffic that has already penetrated through the perimeter defense firewall. Again, as I type 2) deployments, if it is necessary to more clearly differentiate between different severities of attacks, or in case of sensors monitoring high traffic volume, the sensors can be tuned more finely in this deployment scenario. Configuring the NIDS can be done with knowledge of the specifics about the critical systems, with less concern with the entire internal infrastructure, and the NIDS can be configured accordingly.

Another aspect of deploying NIDS sensors is connectivity to the NIDS management system. This connectivity can be either in-band, using same route as normal traffic, or out-of-band, using dedicated communication links. Out-of-band communication is more secure, in terms of being less susceptible to compromise, of either the NIDS sensors or the NIDS management system. This negates the possibility of spoofing alert reporting, and also ensures that reporting is transparent to normal infrastructure bandwidth requirements.

It is noted here that monitoring communication can entail examining network traffic for the signatures of known threat sources. Monitoring can also entail comparing the source of a communication with its intended recipient. If an authorized network user, for example, attempts to access a service or subsystem to which it has no authorized access, an alert can be raised to network management.

Determining a deployment location can also entail an understanding of the network's topology. The network topology of a complex network infrastructure for which the attack detection capability is sought can be clearly mapped prior to sensor deployment by using a network discover and mapping tool A number of such tools are available to network management. The results can be further validated with a manual audit of all the systems/devices. This helps in confirming that the right assumptions (in terms of connectivity) have been made while designing the sensor deployments and also help in identifying the positions and connectivity of any unknown systems that need to be considered.

The vulnerabilities of specific systems within a network are also determinable. For best deployment of a sensor in this embodiment, each system for which sensor protection is sought can be evaluated to find details which enhance NIDS sensor configuration. A vulnerability assessment system, of which several are known, can identify the following: the type of operating system and its specific information such as version and service pack, etc. or the type of firmware employed in the systems and its specific information such as release number; the type of patches, both in the operating system as well as in applications, applied to these systems, and the type of attacks that they are supposed to address; and the type of service listeners that are authorized to listen on these hosts, the communication type for each of these services, along with any specifics, such as in the case of the use of simple network management protocol (SNMP), whether SNMP v1 or SNMP v3 is used, etc; and the applications that are installed on these systems, and any specifics like version or release number.

The quality of the information gathered in this step can be further improved with the help of a vulnerability assessment system, of which there several known. This system information normally is used for patching and hardening the systems based on the vulnerabilities found by it but the information provided by it may be also used for tuning the NIDS sensors.

Process 100 continues at 130 with tuning the sensor to an appropriate level of awareness. As discussed above, the deployed location of a sensor can bear a great deal on its necessary sensitivity to a possible intrusion. A sensor deployed to monitor communication attempting to penetrate the perimeter defense firewall of a network must be tuned highly to discriminate between a communication that is an actual attempt to penetrate the firewall with a high probability of success, over a communication that is merely a misaddressed communication from a source in the internet, for example. Tuning, in this embodiment, can comprise enabling the sensor with a set of known threat source addresses or with a set of known digital signatures peculiar to unauthorized firewall penetration.

Tuning a NIDS sensor is done, in this embodiment, to avoid a storm of false positive indications. This step helps to ensure the effectiveness of the NIDS solution. Before starting this configuration, configuring signatures for the sensors needs to be done with the awareness of not only the specifics of intercepted signatures, such as what attack is detected but also other related information such as what application or operating system or firmware are the attacks intended to affect and what communication type, with specifics like which revision number, etc., does the attack use.

One embodiment of the present invention uses a three step method outlined below for tuning NIDS sensors.

Step a), Tuning based on the deployment of the sensors, as discussed above. If sensors are deployed to monitor traffic external to a security boundary, then to reduce the possibility of false positives, the sensors can be finely tuned based on the perimeter defense firewall rules so as to alert only for those attacks that have a probability of penetrating through the firewall. For this, the information about the attack signatures and communication types should be checked against the firewall rules. Even though not a requirement, sensors deployed to monitor traffic internal to the security boundary but external to subsystems within the network may be similarly tuned, especially if sensors have difficulty handling the inside-interface traffic that they are monitoring with a non-tuned attack signature base.

Step b), Tuning based on information about the systems that are protected, as gathered in above. This embodiment of the present invention uses this step to achieve an effective NIDS solution. For any deployment scenarios outlined in this discussion of embodiments of the present invention, sensors need to be tuned to raise non-low severity alerts for only those attacks that the protected systems may be affected by. For this the information about the attacks, such as what application or operating system or firmware are the attacks intended to affect needs to be mapped with a superset of all the information that is gathered as part of system assessment part of 110 in FIG. 1. Sensors deployed to monitor traffic intended for specific systems are relatively easier to configure as compared to others.

Step c) Tuning based on observing production environment monitoring After steps a and b above, alerts for sensor need to be monitored in a production environment for a period of time, followed by further tuning of the attack signature monitoring. In one embodiment, this time period can be a week or more. In the case alerts are found to be generated for normal traffic, after a careful analysis of the severity and consequence of the attack, a decision can be made about disabling a signature or lowering the severity of such an alert.

It is noted here that, in another embodiment, a cautionary approach can be taken in tuning. This can be done in the case where perimeter defense fails. Step (b) can be implemented first, and step (a) can be avoided, followed by step (c). It is noted that this approach may result in more effort for step (b).

Process 100 continues with prioritizing alerts, 150, generated by the intrusion detection sensor to achieve an appropriate response by mechanisms of the network. When an intrusion is detected, an appropriate response is generated to that detection. An appropriate response, in this embodiment, is one that takes into account the probable severity of an intrusion's success as well as the probability of successful penetration. An intrusion that has very high likelihood of reaching a target and whose success could result in the loss of important data, for example, can generate a very high level of response which can include an immediate system lockdown. On the other hand, an intrusion which has only a haphazard chance of reaching a target and whose success would not cause any damage, can generate a low level of response, such as an entry into an intrusion log. Several appropriate responses are available between those extreme examples.

Prioritizing the NIDS alerts enables effective alerting and responsive action. Alerts that are kept enabled as part of the sensor tuning process are further configured to a more granular level of severities, meaning a finer gradation between levels. The following guideline is used in assigning severities for alerts associated with each of the attack signatures. It is noted that other embodiments can use other severity guidelines with finer or coarser gradation between levels: Critical severity, signatures that indicate that a system is compromised with a high probability are assigned a Critical severity; Major severity, signatures that indicate that an attack is in progress that might compromise or bring down a system need to being assigned a Major severity; Minor severity, signatures that indicate that an attack is in progress that would affect the protected system in some way without fully compromising it or would get some specific information of the system that would be useful for compromising the system (like known vulnerability scans) need to being assigned a Minor severity; Warning, signatures that indicate either reconnaissance, in the form of a probe, or denial-of-service type attempts can be assigned a Warning severity; Normal, other signatures that do not fit in the above severities but need to be kept enabled as part of the tuning steps for subsequent auditing purposes, and possible later analysis, need to be assigned Normal severity.

At 160, appropriate and effective responses are configured in the mechanisms available to the network and an intrusion detection system. In this embodiment of the present invention, the intrusion detection system is configured to be active. Other embodiments can be configured to be passive.

A response to a specific alert depends on its severity level. Responses in the present embodiment follow the guidelines listed below while configuring the response actions for intrusion signatures. However, other embodiments can be implemented with responses that vary from the guidelines. Reasons for variance can vary, but the response guidelines below provide some flexibility:

High-effect automated actions. A maximum response, such as a lockdown, can include automatically configuring a perimeter defense firewall to block specific ports or an attacker host or shutting down the service on the target host. A minimum response can include killing, or terminating, the session originating from the attacker. In this embodiment of the present invention, a high-effect automated response is only used for critical level alerts.

Low-effect Automated actions: A maximum response can include killing the session originating from the attacker. A minimum response can include an operator's immediate initiation of an automatic action after confirming the attack. In this embodiment of the present invention, a low-effect automated response can be used for critical and major level alerts Operator quick response alert: A maximum response can include a page to a security operator, while a minimum response can include notification to a non-security operator. This level of response is, in this embodiment, used for response to critical and major level alerts Operator response alert: A maximum response can include an automated email to a security operator and a minimum response can include notification to a non-security operator. This level of response is, in this embodiment, used for response to minor and warning level alerts (only when associated with critical resources) alerts Operator daily response alert: A response can include a daily alert report to a security operator. In implementations of this embodiment of the present invention, these alert reports can be read once a day or more often. Other embodiments can entail other frequencies of reading the reports. This level of response is generally used only for warning level alerts Periodic security analysis alert: Responses can include a periodic audit and analysis. In this embodiment, this periodic review can be a part of a periodic security analysis. In some embodiments, the periodicity can be weekly or monthly. Other embodiments can use other periods. This level of response can be for normal level alerts.

When a sensor has detected intrusions, it can be tuned 170 to a finer degree by evaluating its performance against the intrusions detected. For example, if a sensor has raised alerts to a large number of false positive intrusion indications, the tuning can be raised to a higher level so that the sensor will not be so sensitive. This tuning implies appropriately ignoring or filtering out more attack signatures for the specific sensor that raised the false positive alert. If the sensor has failed to indicate intrusions and actual intrusions are known to have occurred, known as false negatives, the tuning can be lowered to make the sensor more sensitive. This implies appropriately configuring or adding more attack signatures for the specific sensor that failed to raise an appropriate positive alert. In this manner, an efficient number of intrusion detection sensors can be effectively deployed so as be resistant false indications. it is noted that this re-tuning effort is greatly reduced when earlier steps are executed properly.

Though the NIDS sensors may be tuned extremely well, because of the possibility of some applications or protocols not being implemented correctly, or owing to some unknown applications or configurations on the network or for a variety of other reasons, false positives can arise. Because of this, it is better that the properly configured IDS be tested in a production environment to detect false positives individually and perform a root-cause analysis on each of them. If it is found that the alerts persist in the production environment and cannot be avoided in any way, then a proper threat analysis is done before lowering their severity level. This is because the signatures that are configured with the above stated logic represent intrusions that cannot be completely harmless. Threat analysis for a signature does not only include using environmental knowledge such as firewall rules and applications being protected, but also the sensitivity of the assets being protected.

Figure 2:
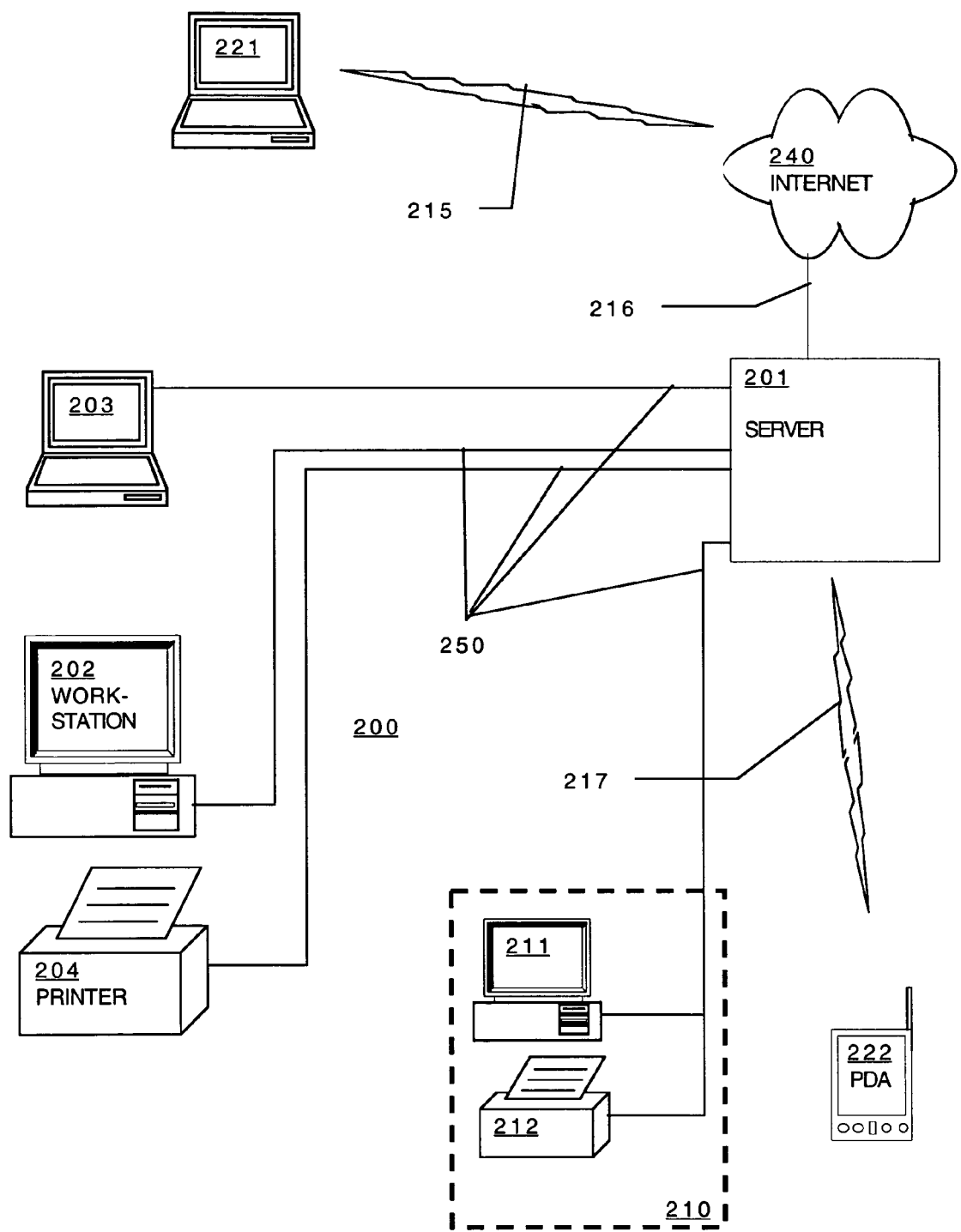
FIG. 2 illustrates a generic computer network in accordance with embodiments of the present invention.

FIG. 2 illustrates an exemplary, generic, computer network in which embodiments of the present invention can be implemented. FIG. 2 illustrates a generic computer network, 200, for communication among and between computer devices and peripherals. Network 200 is, like all networks, characterized by communication links 250 which connect between the elements of the network. In network 200, server 201 is directly linked by hard communication links 250 to work station 202, laptop computer 203, printer 204 as well as personal area network (PAN) 210 which comprises computer 211 and printer 212. It is noted again that these elements comprise a generic network which is only presented here for example. Embodiments of the present invention are enabled to operate in a limitless variety of network configurations.

Exemplary network 200 is also characterized by a link 216 to the internet 240. Virtually all modem networks have some tie to other networks which ultimately enables virtually all networks to talk to one another. This is exemplified by laptop 221 and its wireless link 215 to internet 240. Network 200, via server 201 and link 217, is also accessible to handheld device 222.

The devices and links in this illustration are offered for an example of a network in which an embodiments of the present invention can be implemented. An embodiment could, if implemented in this exemplary network, reside in server 201, or any of the computing devices such as computer 202, laptop 203, or PAN 210□. Intrusions, which embodiments of the present invention are enabled to detect, can come from outside sources, represented by laptop 221, or from devices within the network, such as any computer or handheld computing device 222.

Figure 3:
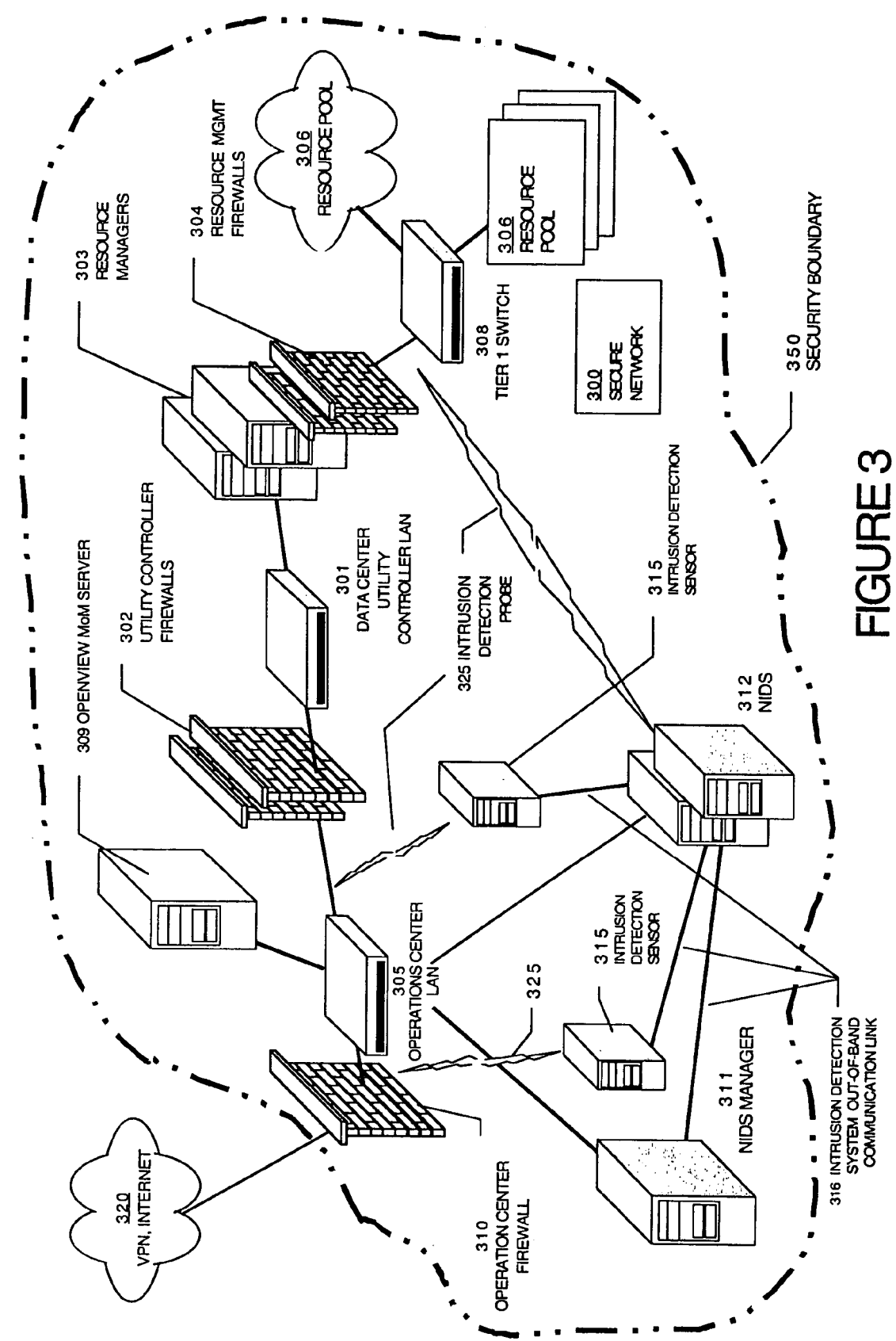
FIG. 3 illustrates an exemplary computer network with deployed intrusion detection sensors in accordance with embodiments of the present invention.

FIG. 3 illustrates a deployable network intrusion detection system 312 with sensors in a network 300, which is implemented with multiple security features. The illustrations of FIG. 3 are common to many types of networks but have particular applicability to a Provisional network or utility data center (UDC). Embodiments of the present invention are not limited to any particular type of network, but the UDC illustrated in FIG. 3 is offered as an example of a complex network which is in need of significant security precautions.

Network 300 is shown bounded by a virtual security boundary 350. Boundary 350 is shown here only to help illuminate the concepts presented herein. Exemplary network 300 comprises an operations center local area network (LAN) 305, a data center utility controller LAN 301 and resource pools 306. It is noted here that, by their very nature, provisionable networks are flexible in their composition, comprising any number and type of devices and systems. However, non-provisionable networks can also comprise a limitless variety of subsystems and devices. The specific architecture illustrated in FIG. 3, therefore, is not meant to limit the application of embodiments of the present invention to any particular network architecture.

Typical network 300, in this illustration, communicates with the outside world via the Internet/virtual public network (VPN),120. The communications links that enable this communication are protected by the operations center firewall 310. Firewall 310 is shown to illustrate a concept and is not meant to imply any particular method or system of intrusion protection. Many types of hardware and software firewalls are well known in the art and firewall 310 may be either or both.

It is noted here that, in typical network 300, there are three "trust domains" illustrated; LANs or subsystems that are accessible to and operated by differing levels of system management. The significance of the distinction in trust level attached to each trust domain will become clearer in subsequent discussion. The level of trust, in embodiments of the present invention, can be established in a trust hierarchy.

Firewall 310 divides an overall trust domain, the network, from the outside world indicated by Internet/VPN 320. Operations center (OC) LAN 305 comprises an internal trust domain. Included in OC LAN 305 are manager-of-managers (MoM) server 309, network intrusion detection system (NIDS) 312, NIDS manager 311 and intrusion detection sensors 315. It is noted that, though NIDS 312, NIDS manager 311 and intrusion detection sensors 315 are illustrated as computer-like devices, their physical existence is not limited to a particular device. Each may exist as a standalone device or implemented as software resident in a physical device or server. Intrusion detection probes 325 are illustrated as actions, rather than any form of device.

The heart of a complex provisionable network, such as the exemplary network illustrated, is the data center utility controller (UC) LAN, 301. This LAN represents another, higher, internal trust domain. UC LAN communicates through OC LAN 305 and is typically separated from it by various forms of firewalls 302. UC LAN 301 can comprise various numbers of resource managers, such as illustrated at 303. The flexibility inherent in the provisionable network concept can result in many combinations of resources and resource managers. Resource managers 303 are the typical interface with the various pools of resources 306, communicating with them through some sort of switching network as indicated by the tier 1 switch at 308.

Resource pools 306 are limitlessly flexible, comprising any conceivable combination of data servers, computational capability, load balancing servers or any other device or capability imaginable. Because the possible varieties of resources that can be included in resource pools 306, they are separated from UC LAN 301 by firewalls 304, which, like UC firewalls 302, can be software or hardware or both, in many combinations.

It is noted again that virtual security boundary 350 does not exist in a physical sense. Resources included in resource pools 306 may include devices and servers located at distance from the other elements of the UDC 300.

NIDS 312 communicates directly with the OC LAN 305. Intrusion detection sensors 315 are deployed in network 300 such that the management components of network 300 are protected from intrusions that originate from either an external source, such as the public facing Internet/VPN Network 320, the managed resources, 306, that are provisioned by network 300, or the systems within the less trusted part of the network management infrastructure.

Communication between the intrusion detection sensors and NIDS is, to as large an extent as practicable, done through out-of-band links such as indicated at 316. It is noted that the term "out-of-band" in used herein to refer to communication over links dedicated to network management traffic and not available to network traffic. By virtue of being unconnected to the network communications links, out-of-band communications are assumably more secure than communications in band.

It is also noted here that firewalls, as indicated at 310, 302, and 304, are used to provide a level of security to the boundaries between trust domains of network. Intrusions, of the type embodiments of the present invention are intended to prevent, typically involve penetration of one or more hardware or software firewalls in reaching an intended target.

It is noted here that clients of a network can originate outside the trust structure and access elements of the network via the Internet or a virtual private network (VPN) resident in the Internet infrastructure.

As shown in FIG. 3, NIDS intrusion detection sensors 315 are deployed so as to probe, 325, communication through the firewalls 302 and 304 that provide ingress/egress to the Data Center Controller LAN 301. Sensors 315 are also deployed around the Resource Managers 303 that act as a gateway between the Managed Resources and the Data Center Controller LAN 301.

The intrusion detection sensors 315, in this embodiment, send alert messages to the NIDS Manager 311. As part of the initiated response to an alert message, the NIDS Manager 311 is configured to raise or lower the priority of each alert depending upon the both the probe that detected the alert and, the type of alert that was detected.

The NIDS Manager 311 in turn sends its highest priority alerts to an alert monitor located in the operations center LAN 305. Not shown in FIG. 3, but present on each computer system in the operations center 305 and data center controller LANs 301, is host intrusion detection system (HIDS) software.

Figure 4:
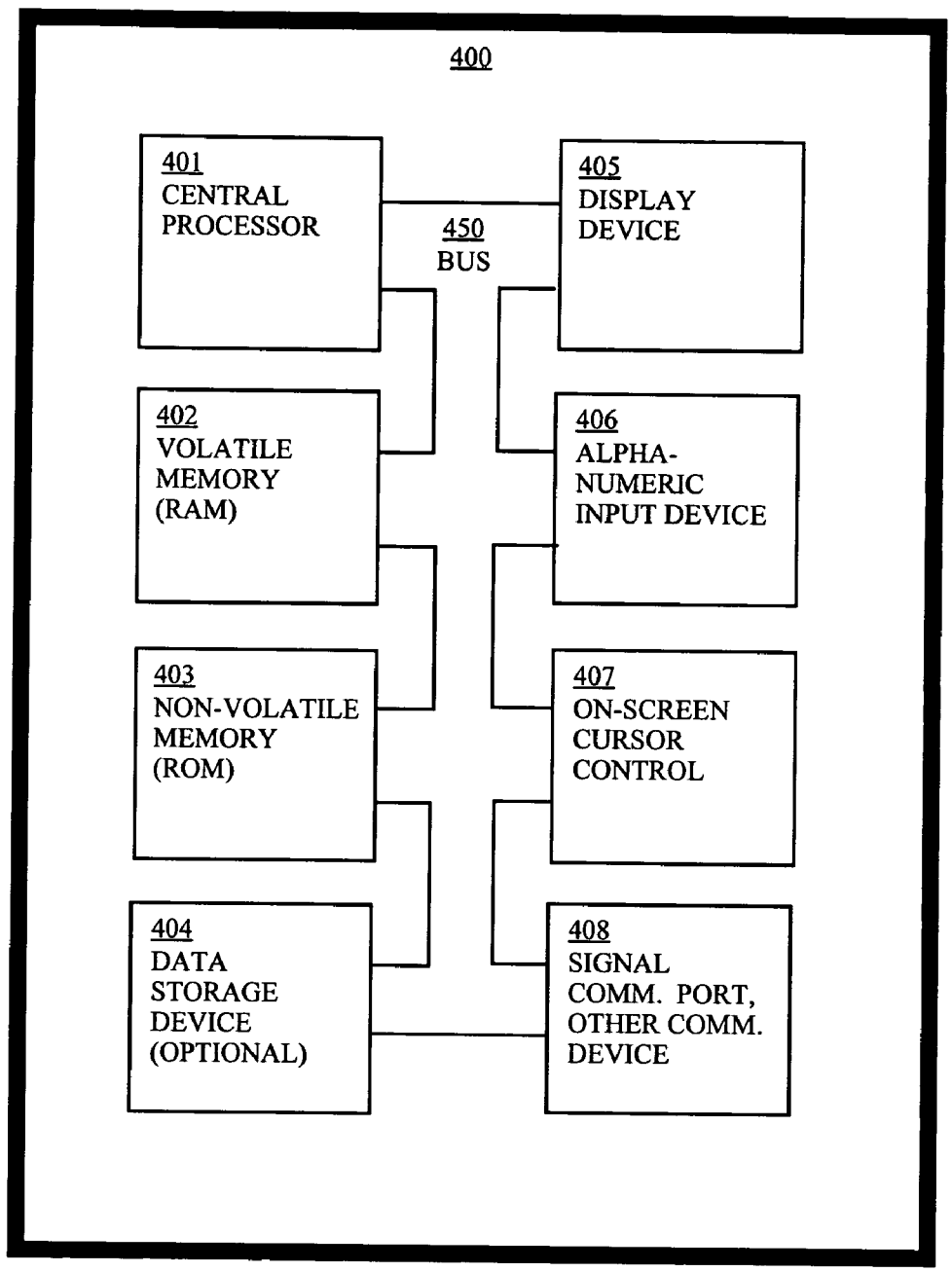
FIG. 4 illustrates a block diagram overview of generic computer system in accordance with embodiments of the present invention.

The software components of embodiments of the present invention run on computers. A configuration typical to a generic computer system is illustrated, in block diagram form, in FIG. 4. Generic computer 400 is characterized by a processor 401, connected electronically by a bus 450 to a volatile memory 402, a non-volatile memory 402, possibly some form of data storage device 404 and a display device 405. It is noted that display device 405 can be implemented in different forms. While a video CRT or LCD screen is common, this embodiment can be implemented with other devices or possibly none. System management is able, with this embodiment of the present invention, to determine the actual location of the means of output of alert flags and the location is not limited to the physical device in which this embodiment of the present invention is resident.

Similarly connected via bus 450 are a possible alpha-numeric input device 406, cursor control 407, and communication I/O device 408. An alpha-numeric input device 406 may be implemented as any number of possible devices, including video CRT and LCD devices. However, embodiments of the present invention can operate in systems wherein intrusion detection is located remotely from a system management device, obviating the need for a directly connected display device and for an alpha-numeric input device. Similarly, the employment of cursor control 407 is predicated on the use of a graphic display device, 405. Communication I/O device 408 can be implemented as a wide range of possible devices, including a serial connection, USB, an infrared transceiver, a network adapter or an RF transceiver.

The configuration of the devices in which this embodiment of the present invention is resident can vary without effect on the concepts presented here. The flexibility of the UDC concept provides a limitless variety of possible hardware device and inter-linking combinations in which embodiments of the present invention are able to provided.

This description of embodiments of the present invention presents a method for deploying network intrusion detection sensors in a provisionable data center, also known as a utility data center (UDC), in a cost effective manner. Embodiments provide a step-by-step process by which the locations most vulnerable to intrusion can be protected from intrusions that originate from either an external source, such as the public facing internet/VPN Network, the managed resources that are provisioned by the UDC, or the systems within a less trusted part of the UDC management infrastructure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for configuring an intrusion detection system in a network, comprising:
    determining a location for a deployed intrusion detection sensor of said intrusion detection system wherein said sensor in enabled to monitor communication in a portion of said network;
    deploying said intrusion detection sensor in said location in said network;
    tuning said intrusion detection sensor to an appropriate level of awareness of content in said communication in said network so that an appropriate response can be generated based on a type of a detected intrusion in said network;
    prioritizing responses generated by said intrusion detection sensor to achieve said appropriate response to said detected intrusion in said network, wherein said prioritizing is based on said type of said detected intrusion; and
    configuring intrusion response mechanisms in said network so that said mechanisms provide said appropriate response to said detected intrusion.

2. The method described in claim 1 further comprising re-tuning said intrusion detection sensor in response to a prior intrusion detection.

3. The method described in claim 1 wherein said network comprises communication protected by a firewall.

4. The method described in claim 1 wherein said determining comprises determining a cost effective location in said network.

5. The method described in claim 1 wherein said deploying comprises locating said sensor in a logical location in said network suitable to said monitoring said communication and to communicating out-of-band with said intrusion detection system.

6. The method described in claim 1 wherein said prioritizing comprises enabling said intrusion detection sensor to scale a response to a determined level of threat posed by an intrusion.

7. The method described in claim 1 wherein said network is a provisionable network.

8. The method described in claim 7 wherein said provisionable network comprises a utility data center.

9. The method described in claim 1 wherein said tuning comprises desensitizing said sensor to an intrusion representing a low probability of penetrating a firewall.

10. The method described in claim 9 wherein said desensitizing comprises checking the attack signature of an intrusion against a set of firewall rules.

11. The method described in claim 1 wherein said tuning comprises desensitizing said sensor to reduce false positive indications over an extended period.

12. A system for protecting security of a provisionable network, comprising:
   a network server;
   a pool of resources coupled with said server for employment by a client;
   a resource management system for managing said resources; and
   an intrusion detection system enabled to detect and respond to an intrusion in said network, wherein said intrusion detection system comprises an intrusion detection sensor that is tunable to determine a threat level nosed by a detected intrusion.

13. The system described in claim 12 wherein said provisionable network comprises a utility data center.

14. The system described in claim 12 wherein said intrusion detection system is tunable to generate a response appropriate to said threat level of said detected intrusion.

15. The system described in claim 14 wherein said response comprises an alarm.

16. The system described in claim 14 wherein said response comprises a lockout of a portion of said network.

17. A network intrusion detection system, comprising:
   a network device comprising intrusion detection software, said device communicatively coupled with a provisionable network;
   a trust hierarchy, comprising a portion of said network and enabled to communicate with said software and to cause evaluation of a detected intrusion;
   a deployable, tunable, intrusion detection sensor; and
   a network device enabled to generate a response to a detected intrusion.

18. The intrusion detection system described in claim 17 wherein said network comprises a utility data center.

19. The intrusion detection system described in claim 17 wherein said provisionable network comprises a resource pool.

20. The intrusion detection system described in claim 17 wherein said provisionable network comprises a resource manager.

21. The intrusion detection system described in claim 17 wherein said provisionable network comprises a network intrusion detection system.

22. The intrusion detection system described in claim 17 wherein said providing a deployable intrusion detection probe is accomplished in said network intrusion detection system.

23. The intrusion detection system described in claim 17 wherein said generating an alert based on said detection of said intrusion is accomplished in said network intrusion detection system.

24. The intrusion detection system described in claim 17 wherein said trust hierarchy is configurable.

25. The intrusion detection system described in claim 17 wherein said generating a response comprises initiating a lockout of a portion of said network.

* * * * *

UNITED STATES PATENT AND TRADEMARK OFFICE
CERTIFICATE OF CORRECTION

PATENT NO. : 7,228,564 B2  Page 1 of 1
APPLICATION NO. : 10/627374
DATED : June 5, 2007
INVENTOR(S) : Amit Raikar et al.

It is certified that error appears in the above-identified patent and that said Letters Patent is hereby corrected as shown below:

In column 9, line 19, delete "modem" and insert -- modern --, therefor.

In column 13, line 15, in Claim 12, delete "nosed" and insert -- posed --, therefor.

Signed and Sealed this

Twelfth Day of August, 2008

JON W. DUDAS
*Director of the United States Patent and Trademark Office*